US010760905B2

(12) United States Patent
Posey et al.

(10) Patent No.: US 10,760,905 B2
(45) Date of Patent: Sep. 1, 2020

(54) STEERING WHEEL ALIGNMENT APPARATUS FOR ALIGNING A VEHICULAR STEERING WHEEL

(71) Applicant: Ford Motor Company, Dearborn, MI (US)

(72) Inventors: John Posey, Allen Park, MI (US); Todd Sobieralski, Monroe, MI (US); Dan Lockwood, White Lake, MI (US); Richard Cason, Canton, MI (US)

(73) Assignee: Ford Motor Company, Dearborn, MI (US)

(*) Notice: Subject to any disclaimer, the term of this patent is extended or adjusted under 35 U.S.C. 154(b) by 238 days.

(21) Appl. No.: 16/023,609

(22) Filed: Jun. 29, 2018

(65) Prior Publication Data
US 2020/0003555 A1    Jan. 2, 2020

(51) Int. Cl.
G01B 21/26    (2006.01)
B62D 1/04    (2006.01)

(52) U.S. Cl.
CPC ............ G01B 21/26 (2013.01); B62D 1/04 (2013.01); G01B 2210/28 (2013.01)

(58) Field of Classification Search
CPC ........................................................ G01B 21/26
USPC ............................................ 33/203, 203.12
See application file for complete search history.

(56) References Cited

U.S. PATENT DOCUMENTS 5,105,546 A     4/1992  Weise et al.
5,218,769 A *   6/1993  Tranchon ............. G01D 5/3473
                                                          33/1 N
5,855,072 A *   1/1999  Nakaho ............... B62D 15/022
                                                          33/1 N
6,076,269 A     6/2000  Sekino et al.
6,155,106 A *   12/2000 Sano ..................... B60R 16/027
                                                          33/1 N
6,948,259 B1 *  9/2005  Hatfield ................ G01B 5/0025
                                                          33/600
7,036,240 B1 *  5/2006  Hatfield ............. G01D 5/34738
                                                          33/600

(Continued)

FOREIGN PATENT DOCUMENTS

CN          203427881          2/2014
DE          102005042446       11/2006

(Continued)

OTHER PUBLICATIONS

Romess electronic, Diagnostic Tools Manufacturer and Supplier, offering wheel adjustment. Steering Wheel Adjusting Balance RNW 2009, product page available at URL http://en.ofweek.com/Product/Steering-Wheel-Adjusting-Balance-prod-2615-8144.html.

(Continued)

Primary Examiner — George B Bennett
(74) Attorney, Agent, or Firm — Burris Law, PLLC

(57) ABSTRACT

The present disclosure is directed toward a steering wheel alignment apparatus that includes a sensor, a sensor housing, an anchor portion, and a weighted portion. The sensor is configured to measure an angular position of the steering wheel. The sensor housing defines a cavity to hold the sensor. The anchor portion extends from the sensor housing and is configured to engage with a low portion of a steering wheel. The weighted portion extends from the anchor portion to bias the sensor housing toward the low portion.

20 Claims, 5 Drawing Sheets

(56) References Cited

U.S. PATENT DOCUMENTS

| | | | | |
|---|---|---|---|---|
| 7,318,287 B1* | 1/2008 | Hatfield | ............... | G01B 5/0025 |
| | | | | 33/600 |
| 8,844,147 B2* | 9/2014 | Wilds | ....................... | B62D 1/00 |
| | | | | 33/301 |
| 2004/0107591 A1* | 6/2004 | Cuddy | ..................... | G01C 9/00 |
| | | | | 33/370 |
| 2013/0227848 A1* | 9/2013 | Wilds | ....................... | G01C 9/02 |
| | | | | 33/301 |
| 2017/0131095 A1 | 5/2017 | Kim | | |

FOREIGN PATENT DOCUMENTS

| | | |
|---|---|---|
| JP | S57175471 | 10/1982 |
| JP | 2009204325 | 9/2009 |

OTHER PUBLICATIONS

Fori Automation Inc., Steering Wheel Leveler, Global Design & Builder of Assembly, Welding & Testing Equipment Aug. 2013 product pages available at URL http://www.foriauto.com/Portals/0/Images/End%20of%20Line.pdf.

\* cited by examiner

STEERING WHEEL ALIGNMENT APPARATUS FOR ALIGNING A VEHICULAR STEERING WHEEL

FIELD

The present disclosure relates to a steering wheel alignment apparatus, or more particularly a clear vision tool for aligning a steering wheel of a vehicle.

BACKGROUND

The statements in this section merely provide background information related to the present disclosure and may not constitute prior art.

During manufacturing, a vehicle may undergo a steering wheel alignment process to verify the alignment of the steering wheel with respect to the wheels of the vehicles, or in other words, direction of travel of the vehicle. For example, for a front drive vehicle, the front wheels of the vehicle are rotated and directed in one or more directions to obtain various measurements, such as direction of tires relative to a centerline of the vehicle, inclination of the steering wheel, and suspension angle.

To measure the inclination of the steering wheel, a steering alignment tool, which may also be referred to as a clear vision tool, is arranged on the steering wheel. Generally, the steering alignment tool is more of a fixture that has complex components with many moving parts. For instance, the tool is typically positioned at an upper portion of the steering wheel and requires contact with a windshield of the vehicle for additional stability. With the high center of gravity and interaction with the windshield, the alignment tool can inadvertently rotate the steering wheel out of position and/or restrict the movement of the steering wheel during testing. These and other issues are addressed by the teachings of the present disclosure.

SUMMARY

This section provides a general summary of the disclosure, and is not a comprehensive disclosure of its full scope or all of its features.

In one form, the present disclosure is directed toward a steering wheel alignment apparatus that includes a sensor configured to measure an angular position of the steering wheel, a sensor housing defining a cavity, an anchor portion, and a weighted portion. The anchor portion extends from the sensor housing and is configured to engage with a low portion of a steering wheel. The weighted portion extends from the anchor portion to bias the sensor housing toward the low portion.

In another form, the steering wheel alignment apparatus further includes a wheel fastener arranged with the sensor housing and operable to engage with a rim of the steering wheel.

In yet another form, the wheel fastener is configured as a pivotable hook to couple and decouple from the rim of the steering wheel.

In one form, the steering wheel alignment apparatus further includes a rear fastener arranged with the weighted portion and configured to engage with a back surface of the steering wheel.

In another form, the steering wheel alignment apparatus further includes a cover provided at the cavity.

In yet another form, the cover defines an access port for a cable that communicably couples the sensor to a controller.

In one form, the sensor housing, the anchor portion, and the weighted portion form a body, and a center of mass of the body is provided between the anchor portion and the weighted portion.

In another form, the sensor is an inclinometer.

In one form, the present disclosure is directed toward a steering wheel alignment apparatus that includes a sensor configured to measure an angular position of the steering wheel, and a body that defines a cavity to house the sensor. The body further has an anchor portion and a weighted portion with the anchor portion disposed between the cavity and the weighted portion. The anchor portion defines a mating surface configured to engage with a surface of a low portion of a steering wheel. The weighted portion extends from the anchor portion and is configured to pass through an opening defined by the low portion, and a center of mass of the body is provided between the anchor portion and the weighted portion.

In another form, the steering wheel alignment apparatus further includes a wheel fastener pivotably coupled to the body to engage with a rim of the steering wheel.

In yet another form, the wheel fastener is configured as a hook to fasten couple and decouple the body to and from the rim.

In one form, the steering wheel alignment apparatus further includes a rear fastener arranged with the weighted portion and configured to engage with a back surface of the steering wheel.

In another form, the steering wheel alignment apparatus further includes a cover disposed at the cavity of the body.

In yet another form, the cover defines an access port for a cable that communicably couples the sensor to a controller.

In another form, the anchor portion and the weighted portion are separate components fastened together to form the body.

In yet another form, the body having the cavity, the anchor portion, and the weighted portion is formed as a single component In one form, the present disclosure is directed toward a steering wheel alignment apparatus that includes an inclinometer, and a body that defines a cavity to house the inclinometer. The body has an anchor and a weighted portion. The anchor is arranged between the cavity and the weighted portion, and is configured to engage with a low spoke of a steering wheel. The weighted portion biases the body such that a center mass of the body is between the anchor and the weighted portion.

In another form, the steering wheel alignment apparatus further includes a fastener pivotably coupled to the body to engage with a rim of the steering wheel.

In yet another form, the steering wheel alignment apparatus further includes a rear fastener arranged with the weighted portion and configured to engage with a back surface of the steering wheel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
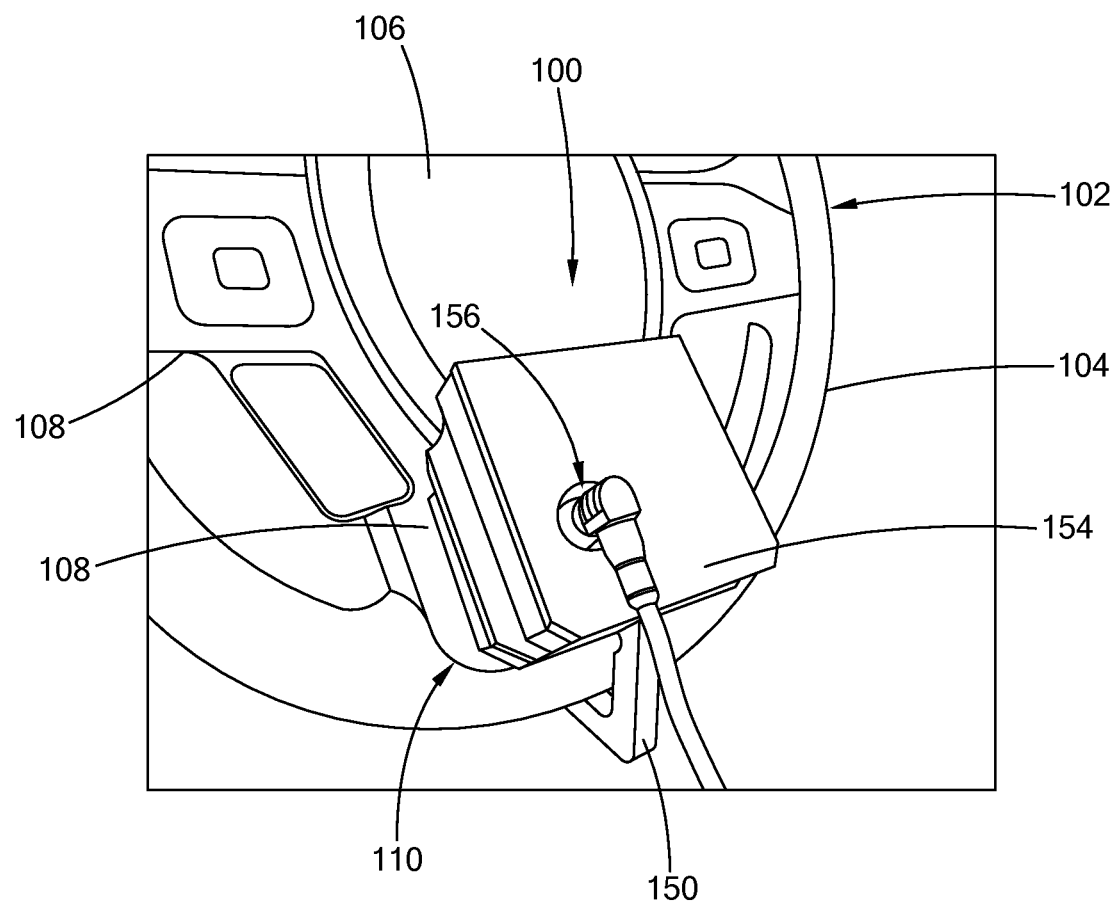
FIG. 1 illustrates a steering wheel alignment apparatus disposed on a steering wheel in accordance with the teaching of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a steering wheel alignment apparatus that is configured to engage with a low portion of the steering wheel without contacting other components/parts of the vehicle. The apparatus includes a sensor that measures the inclination of the steering wheel during the alignment procedure, and a body that houses the sensor and has an anchor portion and a weighted portion for positioning and self-centering the apparatus at the low portion.

Figure 2:
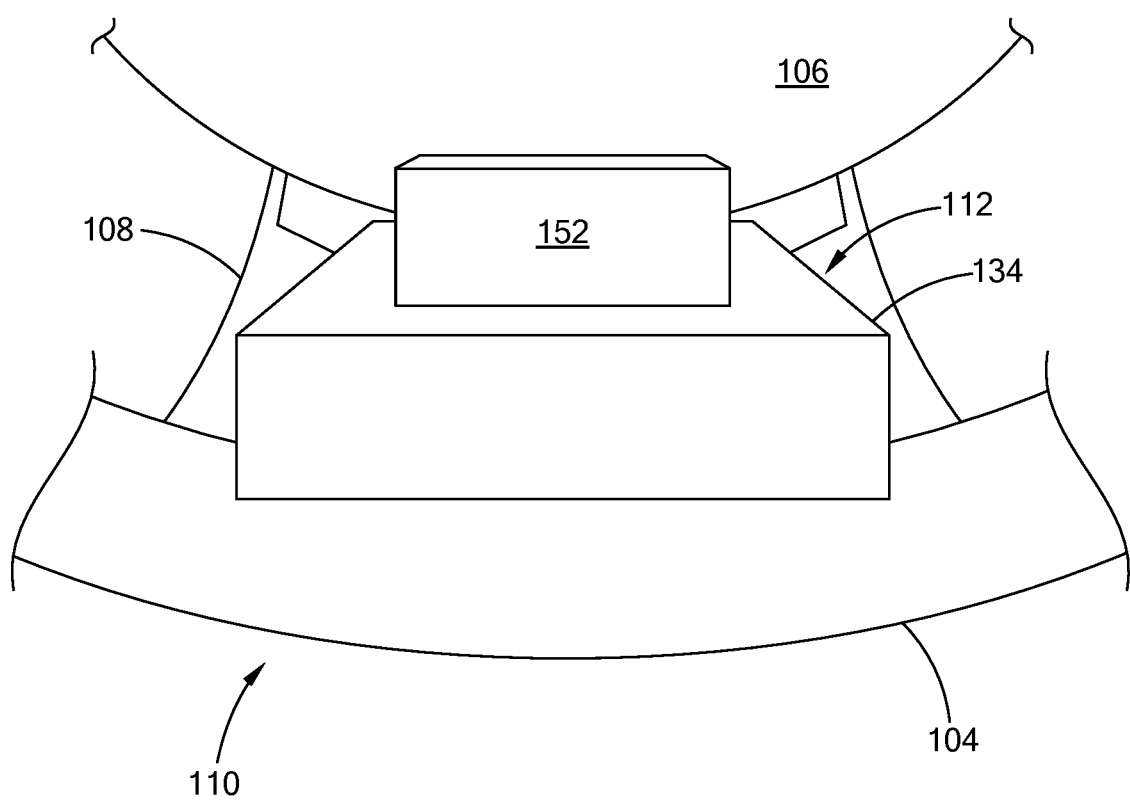
FIG. 2 illustrates a rear view of the steering wheel alignment apparatus of FIG. 1.

Referring to FIGS. 1 and 2, a steering wheel alignment apparatus 100 is arranged on a steering wheel 102 that includes a rim 104, a hub assembly 106, and one or more spokes 108 extending between the hub assembly 106 and the rim 104. In one form, the steering wheel 102 includes a low portion that is generally identified by reference number 110, and defines an opening 112 between the hub assembly 106 and the rim 104 (see FIG. 2). The low portion 110 is provided about the six o'clock position of the steering wheel when the steering wheel is at rest to have the vehicle wheels directed straight, and can be defined by the rim 104, the hub assembly 106, and/or the spokes 108. As described further herein, the steering wheel alignment apparatus 100 is configured to engage with the low portion 110 of the steering wheel 102 and extend through the opening 112. In one form, the apparatus 100 is operable to fasten to the rim 104 and to a back surface 114 of the hub assembly 106 (FIG. 2).

Figure 3:
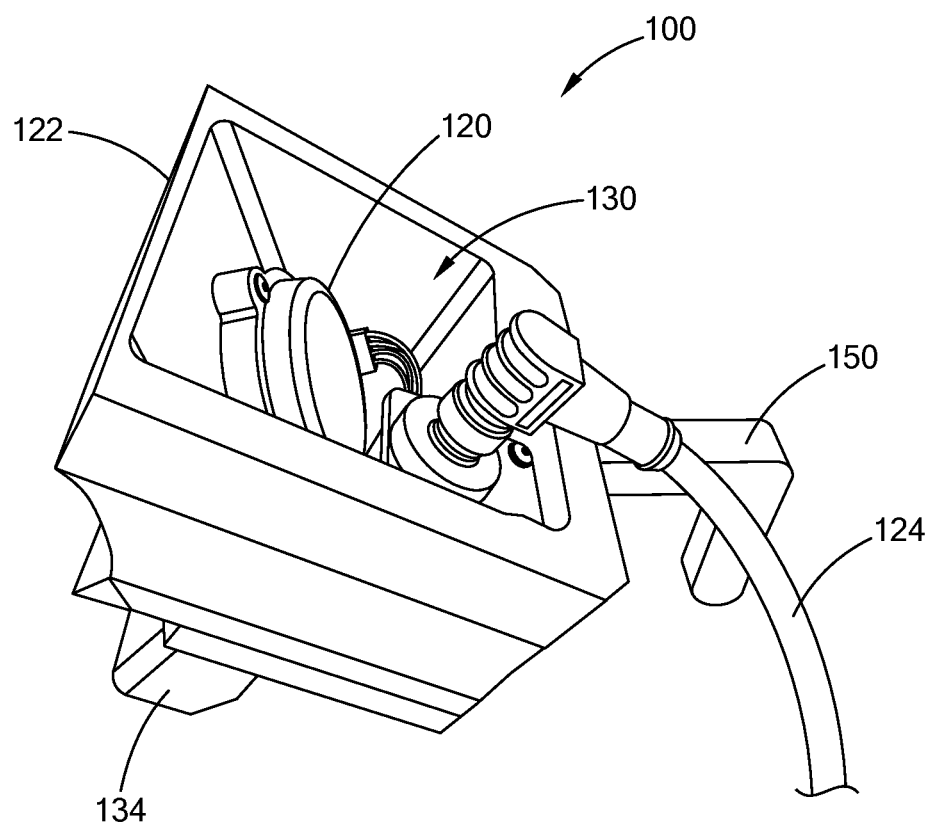
FIG. 3 is a perspective view of the steering wheel alignment apparatus in accordance with the teachings of the present disclosure.
Figure 4:
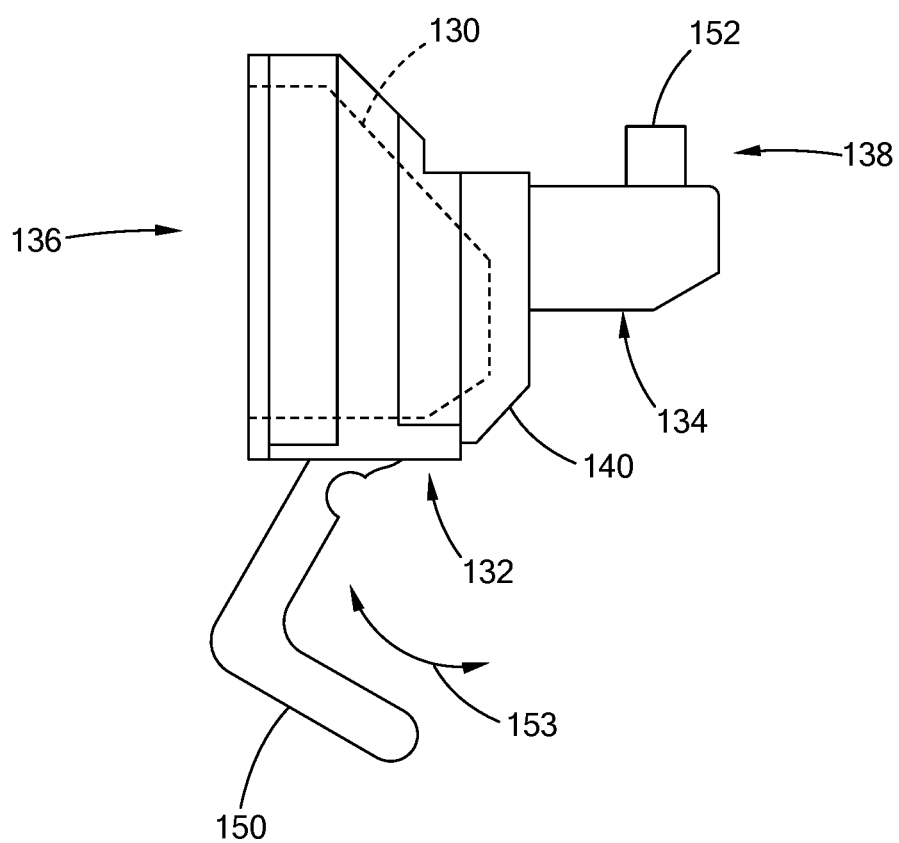
FIG. 4 is a side view of the steering wheel alignment apparatus in accordance with the teachings of the present disclosure.
Figure 5:
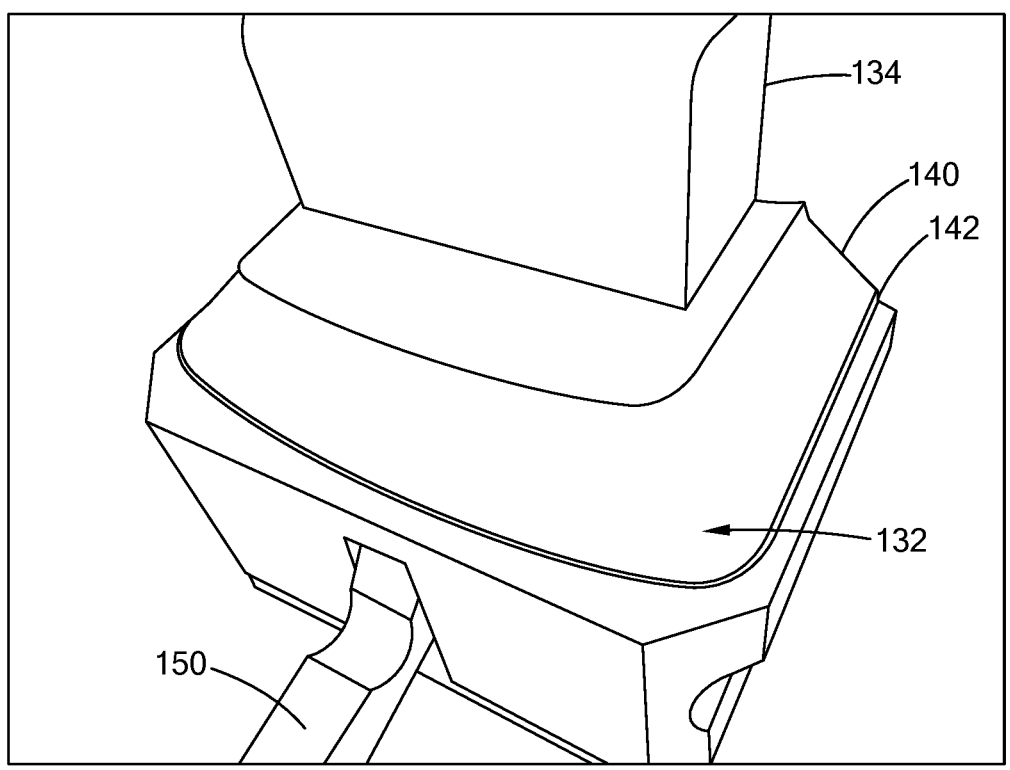
FIG. 5 is a partial perspective rear view of the steering wheel alignment apparatus in accordance with the teachings of the present disclosure.

Additional reference to FIGS. 3-5, the apparatus 100 includes a sensor 120 and a body 122 configured to engage and anchor the apparatus 100 with the steering wheel 102. In one form, the sensor 120 is an inclinometer that is communicably coupled to an external controller (not shown) for measuring a tilt of the steering wheel 102 relative to a vertical axis. The sensor 120 is communicably coupled to the external controller by way of a cable 124 to output the measurement. Alternatively, the sensor 120 may be in communication with the external controller by way of wireless communication link, such as BLUETOOTH, WI-FI, etc, and thus, the sensor 120 may include additional circuitry/components (e.g., transceiver) for enabling such wireless communication.

The body 122 of the apparatus 100 is configured to position and center the apparatus 100 at the low portion 110 of the steering wheel 102. In one form, the body 122 defines a cavity 130 for housing the sensor 120, and has an anchor portion 132 and a weighted portion 134. The cavity 130 is defined at a frontal area of the body 122, which is generally identified by reference number 136, and an form a sensor housing. In one form, the sensor 120 is arranged within the cavity 130 to align with a vertical axis that is substantially perpendicular to a length of the vehicle when the apparatus 000 is installed in the vehicle. The sensor 120 is secured within the cavity 130 be way of a fastener (e.g., a bracket, screw, adhesive).

The anchor portion 132 extends from the sensor housing at a rear area of the body 122, which is generally identified by reference number 138. The anchor portion 132 is configured to engage with the low portion 110 of the steering wheel 102 to center the apparatus 100 with the steering wheel 102. The anchor portion 132 can be configured in various suitable ways based on configuration of the low portion 110 it is engaging with. More particularly, in one form, the anchor portion 132 includes a mating surface 140 that is configured to coincide with a surface of the low portion 110. For example, if the spokes extending at the low portion 110 has a convex surface, the mating surface 140 may have a concave surface to coincide with the convex surface. In another example, if the low portion 110 includes a groove, the anchor portion 132 includes a step 142 or in other words, an edge, to engage with the groove. Accordingly, with the apparatus 100 arranged on the steering wheel 102, the anchor portion 132 rests firmly at the low portion 110 to position and center the apparatus 100.

The weighted portion 134 extends from the anchor portion 132 and is configured to pass through the opening defined by the low portion 110 to extend beyond the rim 104 (see FIG. 2). The weighted portion 134 biases the sensor housing toward the low portion 110. More particularly, the anchor portion 132 and the weighted portion 134 are configured such that the center of mass of the body 122 is between the anchor portion 132 and the weighted portion 134. Accordingly, when positioned in the steering wheel 102, the apparatus 100 is prevented from moving or falling off the steering wheel 102 in a direction away from the opening 112. The weighted portion 134 may be configured in various suitable ways. In one form, the weight or mass of the weighted portion 134 is selected based of the weight or mass of the sensor housing, such that the weighted portion 134 counter balances the sensor housing. The shape of the weighted portion 134 is based on the opening 112 defined by the low portion 110. For example, the weighted portion 134 may be a hollow rectangular block that extends from the anchor portion 132. In another example, the weighted portion 134 may be a solid square shape block, which provides additional weight to the end of the body 122.

The body 122 of the apparatus 100 may be formed in various suitable ways to have the cavity 130, the anchor portion 132, and the weighted portion 134. For example, in one form, the body 122 is molded as one solid component having the anchor portion 132 and the weighted portion 134, and undergoes a finishing operation to define the cavity 130 and/or the mating surface(s) of the anchor portion 132. In another example, the body 122 is made of multiple pieces (i.e., 2 or more) to form the sensor housing, the anchor portion 132 and/or the weighted portion 134, and the pieces are joined together via a fastening mechanism (e.g., screws, bolts, adhesive, etc). For example, the weighted portion 134 may be a separate piece from the sensor housing and the anchor portion 132, and attached to the anchor portion 132 via a fastener. The material of the body 122 may be, for example, a polymer based material such as Delrin, or other suitable material.

To further secure the body 122 to the steering wheel 102, the apparatus 100 may also include a wheel fastener 150 and a hub fastener 152. In one form, the wheel fastener 150 is provided as a hook at that is pivotably attached to the body 122, as indicated by arrow 153 in FIG. 4, at an area in proximity to the cavity 130 (i.e., at the sensor housing). The hook is operable to couple to the rim 104 of the steering wheel 102 (see FIG. 1) or decouple from the rim 104. In addition, the wheel fastener 150 may be configured to also be used as a handle for an operator.

The hub fastener 152 is configured to engage with the hub assembly 106 of the steering wheel 102. In one form, the hub fastener 152 is arranged on the weighted portion 134 and is a bar latch that catches a back surface of the hub assembly 106 when the apparatus 100 is positioned in the steering wheel 102 (see FIG. 2).

The apparatus 100 may also include a cover 154 that is disposed at the cavity 130 to protect the sensor 120 (see FIG. 1). In one form, the cover 154 defines an access port 156 for the cable that communicably couples the sensor 120 to the external controller, and is may be attached to the body 122 via one or more fasteners (e.g., screws, clasp, etc).

In operation, the steering wheel alignment apparatus of the present disclosure is positioned at a low portion of the steering wheel to extend through the opening of the low portion and engage with a surface defined by the low portion. The apparatus self-centers at the low portion via the anchor portion and weighted portion, and may be further secured to the steering wheel via an additional fastener, such as the wheel fastener and/or the hub fastener. The sensor disposed within the cavity transmits measurements to the external controller during the execution of the test. Once completed, the apparatus 100 can be removed from the steering wheel 102 by unfastening the wheel fastener 150 and/or lifting the apparatus away from the lower spoke portion 110. Accordingly, with its low center of gravity position, the apparatus 100 of the present disclosure does not interface with other components/parts in the vehicle for additional stability, such as the windshield, and permits rotational movement of the steering wheel 102 to promote accurate measurements of the steering wheel during testing.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A steering wheel alignment apparatus comprising:
   a sensor configured to measure an angular position of the steering wheel;
   a sensor housing defining a cavity;
   an anchor portion extending from the sensor housing and configured to engage with a low portion of a steering wheel; and
   a weighted portion extending from the anchor portion to bias the sensor housing toward the low portion.

2. The steering wheel alignment apparatus of claim 1 further comprising a wheel fastener arranged with the sensor housing and operable to engage with a rim of the steering wheel.

3. The steering wheel alignment apparatus of claim 2, wherein the wheel fastener is configured as a pivotable hook to couple and decouple from the rim of the steering wheel.

4. The steering wheel alignment apparatus of claim 1 further comprising a rear fastener arranged with the weighted portion and configured to engage with a back surface of the steering wheel.

5. The steering wheel alignment apparatus of claim 1 further comprising a cover provided at the cavity.

6. The steering wheel alignment apparatus of claim 5, wherein the cover defines an access port for a cable that communicably couples the sensor to a controller.

7. The steering wheel alignment apparatus of claim 1, wherein the sensor housing, the anchor portion, and the weighted portion form a body, and a center of mass of the body is provided between the anchor portion and the weighted portion.

8. The steering wheel alignment apparatus of claim 1, wherein the sensor is an inclinometer.

9. A steering wheel alignment apparatus comprising:
   a sensor configured to measure an angular position of the steering wheel; and
   a body defining a cavity to house the sensor, and the body having an anchor portion and a weighted portion with the anchor portion disposed between the cavity and the weighted portion, wherein:
   the anchor portion defines a mating surface configured to engage with a surface of a low portion of a steering wheel, and
   the weighted portion extends from the anchor portion and is configured to pass through an opening defined by the low portion, wherein a center of mass of the body is provided between the anchor portion and the weighted portion.

10. The steering wheel alignment apparatus of claim 9 further comprising a wheel fastener pivotably coupled to the body to engage with a rim of the steering wheel.

11. The steering wheel alignment apparatus of claim 10, wherein the wheel fastener is configured as a hook to fasten couple and decouple the body to and from the rim.

12. The steering wheel alignment apparatus of claim 9 further comprising a rear fastener arranged with the weighted portion and configured to engage with a back surface of the steering wheel.

13. The steering wheel alignment apparatus of claim 9 further comprising a cover disposed at the cavity of the body.

14. The steering wheel alignment apparatus of claim 13, wherein the cover defines an access port for a cable that communicably couples the sensor to a controller.

15. The steering wheel alignment apparatus of claim 9, wherein the sensor is an inclinometer.

16. The steering wheel alignment apparatus of claim 9, wherein the anchor portion and the weighted portion are separate components fastened together to form the body.

17. The steering wheel alignment apparatus of claim 9, wherein the body having the cavity, the anchor portion, and the weighted portion is formed as single component.

18. A steering wheel alignment apparatus comprising:
   an inclinometer; and
   a body defining a cavity to house the inclinometer, and having an anchor and a weighted portion, wherein the anchor is arranged between the cavity and the weighted portion and is configured to engage with a low spoke of a steering wheel, and the weighted portion biases the body such that a center mass of the body is between the anchor and the weighted portion.

19. The steering wheel alignment apparatus of claim 18 further comprising a fastener pivotably coupled to the body to engage with a rim of the steering wheel.

20. The steering wheel alignment apparatus of claim 18 further comprising a rear fastener arranged with the weighted portion and configured to engage with a back surface of the steering wheel.

\* \* \* \* \*